United States Patent [19]
McCord

[11] 3,715,876
[45] Feb. 13, 1973

[54] GRAPE HARVESTER AND FLEXIBLE BAR

[76] Inventor: Philip B. McCord, 9845 East Lake Road, R.D. 1, North East, Pa. 16428

[22] Filed: June 18, 1971

[21] Appl. No.: 154,445

[52] U.S. Cl. ................................56/330, 56/400
[51] Int. Cl. ..............................................A01g 19/00
[58] Field of Search..............56/330, 400, 1, DIG. 2

[56]   References Cited

UNITED STATES PATENTS

| | | | |
|---|---|---|---|
| 3,439,478 | 4/1969 | Orton | 56/1 |
| 3,362,480 | 1/1968 | Barber | 56/400 X |
| 2,856,748 | 10/1958 | Keene | 56/400 |
| 3,045,414 | 7/1962 | Scheidenhelm | 56/400 X |

*Primary Examiner*—Russell R. Kinsey
*Attorney*—Charles L. Lovercheck

[57]   ABSTRACT

The invention disclosed herein is an improved combination grape harvester and flexible bar. The frame of the mobile harvester travels along opposite sides of a row of grape vines which are supported on a trellis wire. The machine has groups of generally horizontal flexible bars extending lengthwise of the rows and moves horizontally back and forth crosswise of the row, vertically positioned to engage and shake the top, bottom and intermediate parts of the fruit bearing vines. Each of the flexible bars has a loop formed at an intermediate point of them so that the bar has additional flexibility and is prevented from breaking and is given an exceeding amount of flexibility.

4 Claims, 7 Drawing Figures

PATENTED FEB 13 1973 3,715,876

Inventor
PHILIP B. McCORD

By
Charles L. Lovercheck  Attorney

PATENTED FEB 13 1973
3,715,876
SHEET 2 OF 2
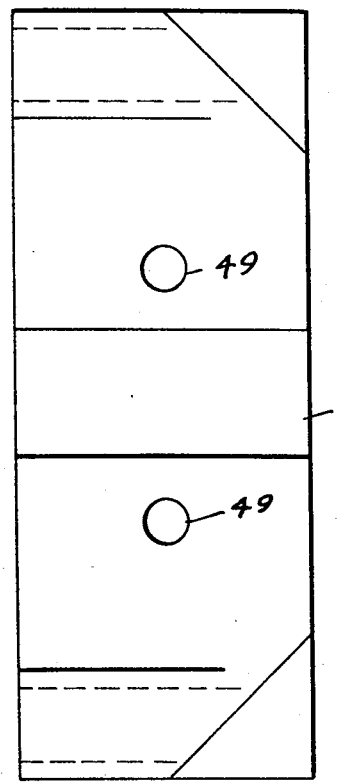
FIG 7
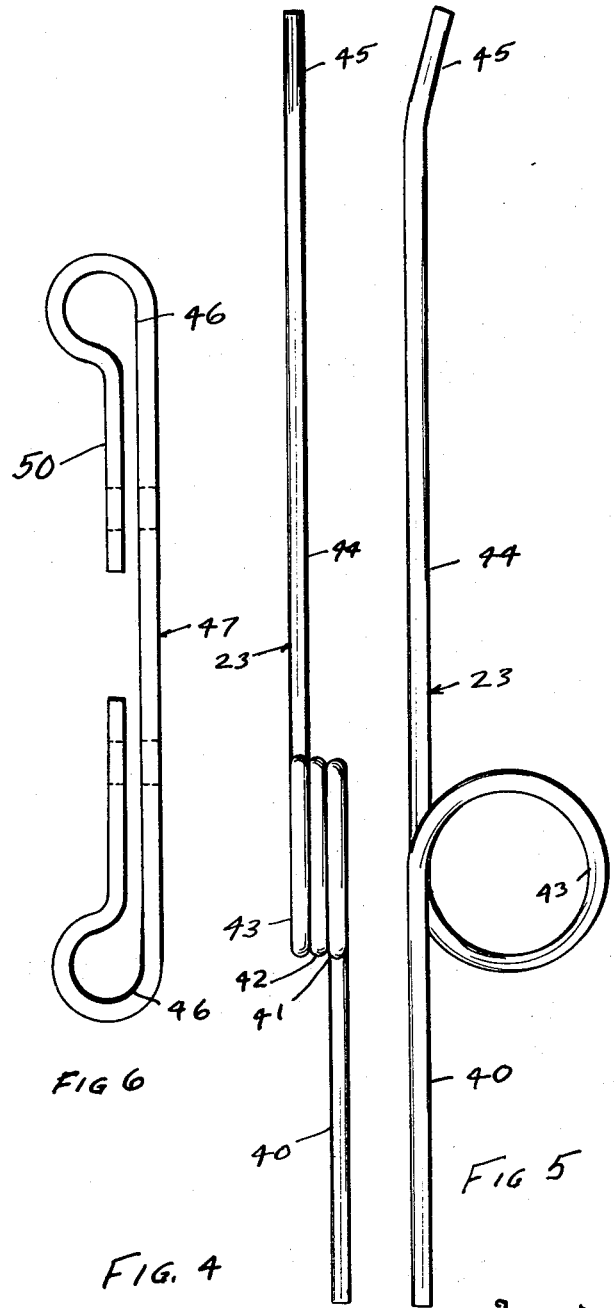
FIG 6
FIG. 4
FIG 5
Inventor
PHILIP B. McCORD
By
Charles L. Lovenshal Attorney

GRAPE HARVESTER AND FLEXIBLE BAR

OBJECTS OF THE INVENTION

It is an object of the invention to provide an improved grape harvester bar.

Another object of the invention is to provide an improved grape harvester.

Another object of the invention is to provide an improved flexible bar for use on a grape harvester.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DESCRIPTION OF THE DRAWINGS

FIG. 4 is a top view of one of the flexible bars.

FIG. 5 is a front view of one of the bars.

FIG. 6 is a front view of a clamping bracket for fastening two of the bars to a machine.

FIG. 7 is a side view of the bracket for attaching the bars.

DESCRIPTION OF PREFERRED EMBODIMENT OF INVENTION

Figure 1:
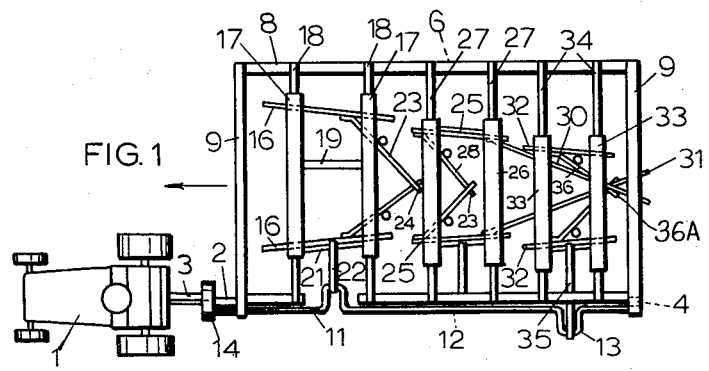
FIG. 1 is a top view of a grape harvesting machine having the improved flexible bars thereon.
Figure 2:
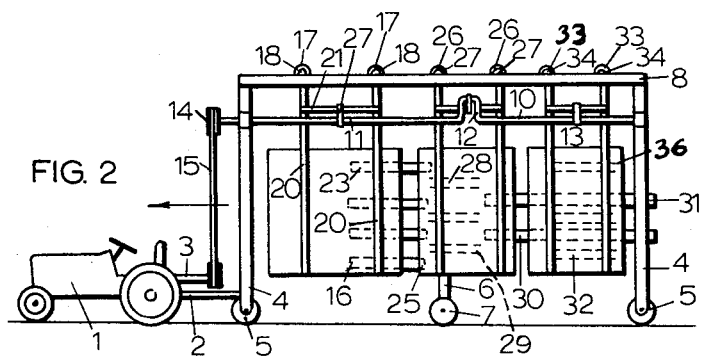
FIG. 2 is a side view of the machine shown in FIG. 1.
Figure 3:
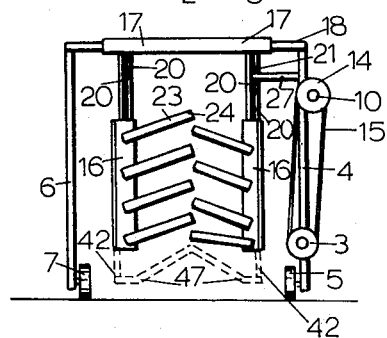
FIG. 3 is a front view of the machine.

The grape harvesting machine according to the invention on which the improved bracket is mounted may be drawn by a tractor 1 which has a suitable draw bar connected to a tongue 2 which is attached to the machine. The machine has a power takeoff shaft 3 which supplies power to the harvesting machine.

The machine has a frame which straddles a row of grapes to be harvested. The frame comprises longitudinally spaced uprights 4 supported on wheels 5. An upright 6 is supported on the opposite side of the row from the caster wheels 5 and the upright 6 has a caster wheel 7 supported on the lower end thereof. The uprights 4 and 6 straddle the row of grapes being harvested and the top frame is made up of cross members 9 which support the lateral parts 9 of the frame together. The power for operating the shaking arms is supplied through the power takeoff of the tractor. The crankshaft 10 is suitably journalled in uprights 4 and has crank throws 11, 12, and 13 which are spaced 120° apart between the uprights. At the front of the crankshaft 10 is a pulley 14 which is driven by belt 15 from the power takeoff shaft 3.

As the harvesting machine is drawn along the row of grapes, the vines are in effect funneled between the shakers which shake the vines with progressively increasing intensity so that when the shakers are finished, no grapes remain on the vines. The shakers crowd the grape vines toward the center of the row and accomplish the shaking with negligible damage to the vines.

At the front or entering end of the machine are vertical plates 16 suspended by a frame having slides 17 carried on crossbars 18 extending between the longitudinal frame members 8. The slides are connected by a cross brace 19 and have fixed thereto depending vertical frame members 20 fixed to the plates 16. Between the vertical members is a cross member 21 connected by a connecting rod 22 to the crank throw. As shown in FIG. 1, the plates are most widely separated at the entering or leading end and converge toward the exit or trailing end. Fixed to the trailing end of the plates are a plurality of generally horizontal vertically spaced flexible bars 23 which converge at an acute angle toward the center of the row and preferably are slightly overlapped at their free or unsupported ends 24. The bars are preferably in staggered relation to each other. The purpose of the flexible bars is to impart a shaking action to the grape vines without injuring the grapes. The shaker bars shake the parts of the vines toward the center of the row. The free ends of the bars project well between plates 25 similarly suspended from slides 26 on crossbars 27 extending between the longitudinal frame members. The plates are likewise most widely separated at the leading ends and most closely separated at the trailing ends. Fixed to the inner sides of the plates adjacent the leading edges are a plurality of sharply converging bars 28 each making an acute angle with the center of the row and each having free ends 29 in overlapping relation at the center of the plates. The bars are flexible and are preferably in staggered relation to each other and to the bars when viewed endwise of the row. Adjacent the trailing edges of the plates 25 are fixed a plurality of long shaker bars 30 having free or unsupported ends 31 overlapping and projecting beyond the trailing end of the machine. The shaker bars 30 extend at an acute angle to the center of the row between plates 32 fixed to slides 33 on crossbars 34 extending between the longitudinal frame members 8 and reciprocated by connecting rod 35 connected to crank throw 13. The plates 32 are the most closely spaced. The plates 32 carry flexible shaker bars 36 fixed to the leading edges of the plates and at an acute angle to the center of the row converging toward the trailing edges of the plates 32. The shaker bars 36 are preferably in staggered relation to each other and to the bars 30 so that each bar acts independently on a different portion of the grape vine. The free ends 36a preferably overlap in the same manner as the free ends of the bars 23, 28, and 30.

The bars 23, 28, 30 and 36 are identical and are shown in particular detail as 23 in FIG. 4 and in FIG. 5. The bars 23 are made of spring steel rods which may be, for example, ½ inch in diameter. They have a shank end 45 and a plurality of loops 41, 42 and 43 and a vine impinging end 40. They terminate in ends shank 45 which may be bent slightly relative to the intermediate part 44.

The shank ends 45 of the bars are inserted in the opening 46 in the bracket 47. The bracket 47 has an intermediate part 48 and holes 49 are formed through the overlapping end 50 of the clamping bracket so that the shank 45 can be securely clamped in the bar in a manner familiar to those skilled in the art. The bracket 48 is then fixed to the plates 16, 25 and 32. In operation the spring steel bars engage the vines and will flex and do less damage to the grapevines and will not break when they engage a particularly rigid grapevine which may be out of place in the row. The spring steel rods may be used to replace the standard fiberglass paddles on the over-the-row type grape harvester. The rods are attached to the vertical plates 16 by using the bracket 47 shown in FIG. 6.

The use of spring steel has many advantages over the standard fiberglass:

1. They will not wear.
2. They will remove grapes at fewer revolutions per minute or beats per minute on the vine, resulting in less damage to the vine, also with less damage to the fruit, resulting in a higher quality product.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A grape harvesting machine comprising,
a frame,
shaker means on said frame,
said shaker means disposed generally in transverse alignment with the direction of travel of said machine and adapted to be disposed on each side of the row of grapes being harvested,
and means for moving the shaking means to shake said fruit from said vines,
said shaker means comprising a platelike member, steel rods fixed to said platelike member and extending from said platelike member and toward said vines and being adapted to engage said vines to shake said fruit,
said steel rods each having at least one loop formed therein adjacent the end that is fixed to said platelike member.

2. The machine recited in claim 1 wherein said steel rods are clamped to said platelike members and supported in pairs of two by means of a bracket on said machine.

3. The machine recited in claim 1 wherein said steel rods are generally straight and have more than one loop formed therein adjacent said platelike member.

4. The machine recited in claim 3 wherein said rods are made of round material and are approximately ½ inch in diameter.

* * * * *